United States Patent [19]

Hirayama

[11] 4,413,596

[45] Nov. 8, 1983

[54] ENGINE COOLING SYSTEM WITH OPTIONALLY COMMUNICABLE HEAD COOLING CIRCUIT AND BLOCK COOLING CIRCUIT, AND METHOD OF OPERATING THE SAME

[75] Inventor: Tsutomu Hirayama, Susono, Japan

[73] Assignee: Toyota Jidosha Kabushiki Kaisha, Aichi, Japan

[21] Appl. No.: 411,804

[22] Filed: Aug. 26, 1982

Related U.S. Application Data

[63] Continuation-in-part of Ser. No. 264,866, May 18, 1981, Pat. No. 4,369,738.

[30] Foreign Application Priority Data

May 21, 1980 [JP] Japan ................................. 55-68036

[51] Int. Cl.$^3$ ........................... F01P 3/02; F01P 7/16
[52] U.S. Cl. ................................ 123/41.1; 123/41.29; 123/41.44; 123/41.82 R
[58] Field of Search ............... 123/41.02, 41.08, 41.09, 123/41.1, 41.29, 41.44, 41.72, 41.81, 41.82 R

[56] References Cited

U.S. PATENT DOCUMENTS

| | | | |
|---|---|---|---|
| 1,985,240 | 12/1934 | Brubaker | 123/41.44 X |
| 3,444,845 | 5/1969 | Schetterlein | 123/41.82 R |
| 3,757,747 | 9/1973 | Hartmann | 123/41.29 X |
| 4,109,617 | 8/1978 | Ernest | 123/41.82 R |
| 4,212,270 | 7/1980 | Nakanishi et al. | 123/41.44 X |
| 4,249,491 | 2/1981 | Stein | 123/196 AB |
| 4,370,950 | 2/1983 | Furukubo | 123/41.08 |

*Primary Examiner*—William A. Cuchlinski, Jr.
*Attorney, Agent, or Firm*—Stevens, Davis, Miller & Mosher

[57] ABSTRACT

An internal combustion engine includes a cylinder head formed with a cooling jacket which has an inlet and an outlet, a cylinder block formed with a cooling jacket which has an inlet and an outlet, and a radiator. A cooling system includes: a first pump for the head jacket, a second pump for the block jacket, a temperature sensor for sensing the temperature of the cooling fluid passing in through the block inlet, a block recirculation conduit system leading from the block outlet so as to supply cooling fluid flow to the block inlet, a main recirculation conduit system of which an upstream part is communicated to the head outlet and a downstream part is communicated to the radiator inlet, a radiator output conduit system which leads from the radiator outlet both to the head inlet and also to the block inlet and which communicates the downstream part of the block recirculation conduit system to the head inlet, a first valve for controlling flow of cooling fluid through the radiator, a flow mixing conduit which communicates a part of the main recirculation conduit system with a part of the block recirculation conduit system, a second valve for controlling flow of cooling fluid through the flow mixing conduit, and a controller which receives the signal from the sensor and which controls the first and second valves.

26 Claims, 2 Drawing Figures

ENGINE COOLING SYSTEM WITH OPTIONALLY COMMUNICABLE HEAD COOLING CIRCUIT AND BLOCK COOLING CIRCUIT, AND METHOD OF OPERATING THE SAME

CROSS-REFERENCE TO THE RELATED APPLICATION

The present application is a continuation-in-part application of application Ser. No. 264,866 filed on May 18, 1981 now U.S. Pat. No. 4,369,738.

BACKGROUND OF THE INVENTION

The present invention relates to an internal combustion engine cooling system, and, more particularly, relates to an internal combustion engine cooling system which provides either combined cooling for a cylinder head and a cylinder block of the engine, or either partly or totally separated cooling for the cylinder head and the cylinder block, according to operational conditions.

There are various considerations which arise with regard to the cooling of internal combustion engines which are cooled by the circulation of cooling fluid in passages or cooling jackets formed in the cylinder head and in the cylinder block thereof. Some of these considerations relate to the cooling of the cylinder head, and others to the cooling of the cylinder block. Nowadays the prior art type old or conventional ways of cooling an internal combustion engine, in which the cooling fluid for the cylinder head was always completely mixed with that for the cylinder block, thus ensuring that the cylinder head and the cylinder block were always at substantially the same temperature, have become inadequate.

One of these considerations is that it is important to maximize the thermal efficiency of an internal combustion engine, and in order to do this it is effective to increase the compression ratio of the engine. However, increase of the compression ratio of the engine is limited by the occurrence of so called knocking or pinking, i.e. of detonation caused by compression ignition, not caused by any spark from a spark plug, of the air-fuel mixture within the combustion chambers of the engine. The occurrence of knocking is generally reduced by keeping the cylinder head as cool as possible, and accordingly when an internal combustion engine is being operated, especially in operational conditions in which the occurrence of knocking is a high possibility, such as high rotational speed high engine load operational conditions, it is very important to cool the cylinder head down to as low a temperature as possible, consistent with other operational considerations.

On the other hand, it is not very advantageous to cool down the cylinder block of the engine to a very low temperature, because in that case the temperature of the lubricating oil contained within the cylinder block, which is of course strongly influenced by the temperature of the cylinder block, becomes rather low, thus increasing the viscosity of this lubricating oil and causing unacceptably high mechanical energy losses in the engine. Further, because the viscosity of the lubricating oil within the cylinder block when this oil is cold, i.e. when it is not at proper operating temperature, is higher than when said lubricating oil is at operating temperature, therefore of course while this lubricating oil is cold this causes substantially increased use of fuel by the internal combustion engine, which is very wasteful. Further, if the temperature of the walls of the cylinders of the engine, i.e. the temperature of the bores thereof, becomes low, then the amount of uncombusted hydrocarbons in the exhaust gases emitted by the engine rises, which can cause a serious problem in view of the standards for control of pollution by automobiles, which are becoming more and more severe nowadays.

Another problem that occurs if the temperature of the cylinder block gets low is that wear on the various moving parts of the internal combustion engine, especially bore wear, rises dramatically. In fact, a large proportion of the wear on the bores of an internal combustion engine occurs when the engine is in the non fully warmed up condition, both because the lubricating qualities of the lubricating oil in the engine are not good at low temperatures, and also because the state of mechanical fit to which the parts of the engine are "worn in" or "run in" is appropriate to their physical dimensions when at proper engine operating temperature, and accordingly in the cold or the semi cold condition these parts do not mate together very well.

These problems that arise when the cylinder block of an internal combustion engine becomes too cold during actual running operation of the engine of course also apply with equal force during the warming up process of the internal combustion engine, after it has been started up from the cold condition and before it has attained normal operating temperature. Especially, the problem of excessive wear on the moving parts of the internal combustion engine, and the problem of excessive emission of uncombusted hydrocarbons in the exhaust gases of the internal combustion engine, are particularly serious during warming up operation. In fact, in view of this matter, it has in the past been an important design goal for internal combustion engines for the moving parts thereof to be warmed up as soon as practicable, or at any rate to be brought to an intermediate temperature higher than a very cold non operating temperature as soon as practicable.

According to these considerations, it is important to warm up the cylinder block of an internal combustion engine as quickly as possible, when the engine is started from the cold condition, and to keep the cylinder block at quite a high operating temperature thereafter. A difficulty arises in this regard, because during the operation of an internal combustion engine most of the heat which is being generated in the combustion chambers thereof by combustion of air-fuel mixture therein is in fact communicated not to the cylinder block of the engine, but to the cylinder head thereof. Therefore transfer of heat from the cylinder head wherein said heat is generated to the cylinder block is very important, especially during the warming up process of the engine. Of course, such heat transfer can take place by the process of heat conduction, since the cylinder head is clamped to the cylinder block, typically however with the interposition between of a head gasket which may have a rather low heat conductivity. However, it is desirable to convey heat from the cylinder head to the cylinder block, during engine warmup, more quickly than can be accomplished by this conduction process, and the conventional above described mixing of the cooling fluid circulating within the cylinder head with the cooling fluid circulating within the cylinder block, during engine warmup, is effective for achieving this.

In the prior art, it has been proposed to provide completely independent systems for cooling the cylinder head and for cooling the cylinder block, in order to fulfil the first above described objective of cooling the cylinder head to a low temperature in order to avoid knocking, while keeping the cylinder block warmer, and each of these systems has been equipped with its own fluid pump, conduits, radiator, etc. However, such a system does not provide for the above described transfer of heat during the engine warming up process from the cylinder head to the cylinder block via the cooling fluid, and, since the cylinder block has a considerably large heat capacity, this means that the cylinder block does not warm up quickly from the cold condition, with the ill effects detailed above. Also, the provision of two independent cooling systems increases weight to an unacceptably high extent, and increases manufacturing cost. Further, since in the above described system two independent radiators are used, and the flow amount through each of them is individually regulated, it is very difficult to use total radiator cooling capacity fully, because although in some particular set of operational conditions the full cooling capacity of one radiator of one cooling system may not be completely required, it is not practicable to utilize this spare cooling capacity in order to provide additional cooling in the other cooling system, and accordingly one cooling system may become overloaded, while the other is not fully loaded. This operational inflexibility is very troublesome.

SUMMARY OF THE INVENTION

Accordingly, it is the primary object of the present invention to provide a cooling system, and a method for operating said cooling system, which improve upon the anti knock characteristic of an internal combustion engine.

It is a further object of the present invention to provide a cooling system for an internal combustion engine, and a method of operating said cooling system, which keep the cylinder head cool, so as to reduce the possibility of the occurrence of knocking in the combustion chambers of the internal combustion engine.

It is a further object of the present invention to provide a cooling system for an internal combustion engine, and a method of operating said cooling system, which, when the internal combustion engine has reached a steady temperature operational condition, keep the cylinder head thereof cooler than the cylinder block.

It is a further object of the present invention to provide a cooling system for an internal combustion engine, and a method of operating said cooling system, which warm up the cylinder block of the internal combustion engine as quickly as possible from the cold condition.

It is a further object of the present invention to provide a cooling system for an internal combustion engine, and a method of operating said cooling system, which keep the cylinder block of the internal combustion engine considerably warm during operation thereof, thus keeping emission of unburnt hydrocarbons in the exhaust gases of the internal combustion engine low.

It is a further object of the present invention to provide a cooling system for an internal combustion engine, and a method of operating said cooling system, which warm up the lubricating oil in the cylinder block of the engine quickly from the engine cold condition, and which thereafter keep this lubricating oil hot.

It is a further object of the present invention to provide a cooling system for an internal combustion engine, and a method of operating said cooling system, which, by warming up the cylinder block of the internal combustion engine quickly from the cold condition, and by keeping it warm during operation of the internal combustion engine, minimize frictional energy losses in the engine.

It is a yet further object of the present invention to provide a cooling system for an internal combustion engine, and a method of operating said cooling system, which minimize engine warming up time.

It is a yet further object of the present invention to provide a cooling system for an internal combustion engine, and a method of operating said cooling system, which minimize engine wear during the engine warmup process of the internal combustion engine.

It is a yet further object of the present invention to provide a cooling system for an internal combustion engine, and a method of operating said cooling system, which minimize fuel utilization during the engine warmup process of the internal combustion engine.

It is a yet further object of the present invention to provide a cooling system for an internal combustion engine which is of low weight.

It is a yet further object of the present invention to provide a cooling system for an internal combustion engine, and a method of operating the cooling system, which allow for maximum radiator cooling capacity utilization during operation of the internal combustion engine.

It is a yet further object of the present invention to provide a cooling system for an internal combustion engine, and a method of operating the cooling system, which provide a monitoring capacity for the lubricating oil within the cylinder block of the internal combustion engine, and a system for lowering the temperature thereof, should said temperature become excessive.

According to the present invention, these and other objects are accomplished by, for an internal combustion engine comprising: (a) a cylinder head formed with a head cooling jacket for cooling said cylinder head, said head cooling jacket being formed with a cylinder head inlet and a cylinder head outlet; (b) a cylinder block formed with a block cooling jacket for cooling said cylinder block, said block cooling jacket being formed with a cylinder block inlet and a cylinder block outlet; and (c) a radiator formed with an inlet and an outlet; a cooling system, comprising: (d) a first pump for impelling cooling fluid through said head cooling jacket from said cylinder head inlet towards said cylinder head outlet; (e) a second pump for impelling cooling fluid through said block cooling jacket from said cylinder block inlet towards said cylinder block outlet; (f) a block input fluid temperature sensor for sensing the temperature of the cooling fluid which passes in through said cylinder block inlet to said block cooling jacket, and for generating a sensed block input temperature signal representative of said temperature; (g) a block recirculation conduit system leading from said cylinder block outlet of said block cooling jacket so as to supply flow of cooling fluid, from a downstream part of said block recirculation conduit system, to said cylinder block inlet of said block cooling jacket; (h) a main recirculation conduit system, an upstream part of which is communicated to said cylinder head outlet of said head cooling jacket, and a downstream part of which is communicated to said inlet of said radiator; (i) a radiator output conduit system, leading from said outlet of said radiator both to said cylinder head inlet of said head cooling jacket and also to said cylinder block inlet of said block cooling jacket, said downstream part of said block recirculation conduit system being thereby communicated also to said cylinder head inlet of said head cooling jacket; (j) a first control valve for controlling flow of cooling fluid through said radiator according to a radiator flow regulation signal; (k) a flow mixing conduit which communicates a part of said main recirculation conduit system with a part of said block recirculation conduit system; (l) a second control valve for controlling flow of cooling fluid through said flow mixing conduit according to a block flow regulation signal; and (m) a controller, which receives said sensed block input temperature signal from said block input fluid temperature sensor, and which produces, based thereon, said radiator flow regulation signal which is sent to said first control valve, and also said block flow regulation signal which is sent to said second control valve.

According to such a structure, the controller can vary the amount of cooling operation provided for the internal combustion engine, by varying the opening amount of the first control valve, thus varying the amount of cooling fluid passing through the radiator, and can also vary the amount of mixing between the cooling circuit for the cylinder head and the cooling circuit for the cylinder block, by varying the opening amount of the second control valve, thus varying the amount of cooling fluid passing through the flow mixing conduit.

Further, according to a particular aspect of the present invention, these and other objects are more particularly and concretely accomplished by a method for operating the cooling system described above, when said cooling system is filled with cooling fluid, comprising the processes, simultaneously performed, of: (o) operating said first pump and said second pump; and (p) depending upon said sensed block input temperature signal from said block input fluid temperature sensor, performing either one or the other but not both of the following two processes (q) and (r): (q) if said sensed block input temperature signal from said block input fluid temperature sensor indicates a cooling fluid temperature at said cylinder block inlet of said block cooling jacket of less than a certain first predetermined temperature value, then simultaneously: (q1) controlling said first control valve, by said radiator flow regulation signal from said controller, so as substantially to interrupt flow of cooling fluid through said radiator; and (q2) controlling said second control valve, by said block flow regulation signal, so as to allow a flow of cooling fluid through said flow mixing conduit; (r) if said sensed block input temperature signal from said block input fluid temperature sensor indicates a cooling fluid temperature at said cylinder block inlet of said block cooling jacket of greater than said first predetermined temperature value, then simultaneously: (r1) controlling said first control valve, by said radiator flow regulation signal from said controller, so as to allow cooling fluid to flow through said radiator; and (r2) controlling said second control valve, by said block flow regulation signal, so as to allow a controlled flow of cooling fluid through said flow mixing conduit.

According to such a method, during the warming up process of the internal combustion engine, before the cooling fluid which passes in through the cylinder block inlet to the block cooling jacket has attained the first predetermined temperature, the cooling systems for the cylinder head and for the cylinder block are substantially communicated, and no substantial cooling is provided for either by the radiator, so that the heat which is supplied to the cooling fluid within the head cooling jacket is communicated to the cooling fluid within the block cooling jacket, and both the cylinder head and the cylinder block are quickly warmed up together; but, after the cooling fluid which passes in through the cylinder block inlet to the block cooling jacket has attained the first predetermined temperature, then according to process (r1) substantial cooling is provided for the cooling fluid in the head cooling jacket, while according to process (r2) the amount of cooling provided for the cooling fluid in the block cooling jacket is regulated. Thus, after the internal combustion engine has been warmed up, the cylinder block may be kept substantially warmer than the cylinder head.

Further, according to a particular aspect of the present invention, these and other objects are more particularly and concretely accomplished by a method of the sort described above, said cooling system further comprising an engine lubricating oil temperature sensor for detecting the temperature of lubricating oil contained within said cylinder block, and for producing a lubricating oil temperature signal representative thereof, said lubricating oil temperature signal being supplied to said controller, wherein in process (r) the opening amount of said second valve is so controlled, by said block flow regulation signal, as to allow such an amount of cooling fluid to flow through said flow mixing conduit as to keep the sensed block input temperature signal produced by said block input fluid temperature sensor approximately at a level indicative of a second predetermined temperature, except that if the engine lubricating oil temperature signal produced by said engine lubricating oil temperature sensor is indicative of a lubricating oil temperature of the lubricating oil contained within said cylinder block of higher than a third predetermined temperature, then such a block flow regulation signal is supplied to said second control valve as to cause said second control valve to open to the maximum amount; wherein said second predetermined temperature is substantially higher than said first predetermined temperature; wherein said third predetermined temperature is substantially higher than said second predetermined temperature; and wherein in process (r), if said temperature indicated by said sensed block input temperature signal is substantially higher than said second predetermined temperature, and is less than said third predetermined temperature, then said second valve is so controlled, by said block flow regulation signal, as to open up said second valve wider so as to decrease its flow resistance; and, if said indicated temperature is substantially lower than said second predetermined temperature, said second valve is so controlled as to make said second valve more closed so as to increase its flow resistance.

According to such a method, by a feedback control, the cooling fluid temperature at said cylinder block inlet of said block cooling jacket is controlled to be substantially equal to said second predetermined temperature, except in said emergency case when the temperature of said lubricating oil contained within said cylinder block rises to higher than said third predetermined temperature which is the danger temperature.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

Figure 1:
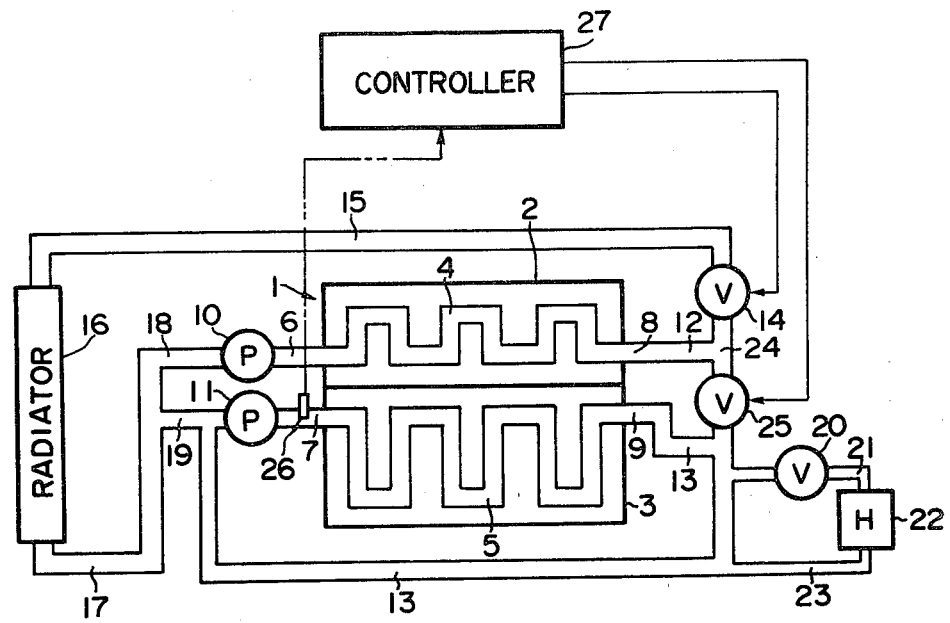
FIG. 1 is a diagrammatical illustration, showing a first preferred embodiment of the cooling system according to the present invention, for practicing a first preferred embodiment of the method according to the present invention, in which only the aforementioned temperature sensor is provided to the cylinder block inlet thereof.

The present invention will now be described with reference to several preferred embodiments thereof, and with reference to the accompanying drawings, FIG. 1 is a diagrammatical view, showing an internal combustion engine which is equipped with a first preferred embodiment of the cooling system according to the present invention, and to which a first preferred embodiment of the method for cooling according to the present invention can be applied. In this figure, the reference numeral 1 denotes the internal combustion engine, which comprises a cylinder head 2 and a cylinder block 3, which are clamped together, optionally with the intervention therebetween of a cylinder head gasket which is not shown.

The internal combustion engine 1 includes at least one combustion chamber, which is not shown, and the cylinder head 2 defines the upper part of this combustion chamber, i.e. the part thereof in which the compression and the ignition occurs, and the surface of which upper part therefore receives the greater proportion of the heat generated in said combustion chamber. The cylinder head 2 is formed with a head cooling jacket 4 which extends close to a large part of said upper part of said combustion chamber, so as, when said head cooling jacket 4 is filled with cooling fluid such as water, to cool said upper part of said combustion chamber, and said cylinder head 2. Typically, the internal combustion engine 1 will in fact include several such combustion chambers, and the head cooling jacket 4 will extend past the upper parts of each of these combustion chambers. Cooling fluid is supplied into the head cooling jacket 4 through a cylinder head inlet 5, and is taken out from the head cooling jacket 4 through a cylinder head outlet 8.

Similarly, the cylinder block 3 is formed with a block cooling jacket 5 which extends close to a large part of the side wall defining surface of said combustion chamber, so as, when said block cooling jacket 5 is filled with cooling fluid, to cool said side wall part of said combustion chamber, and said cylinder block 5. Again, of course, typically the cylinder block 5 will in fact define several such combustion chamber walls or bores, and the block cooling jacket 5 will extend past the side wall parts of each of these bores. Cooling fluid is supplied into the block cooling jacket 5 through a cylinder block inlet 7, and is taken out from the block cooling jacket 5 through a cylinder block outlet 9.

Further, a cooling radiator 16 of a conventional sort, formed with an inlet at its upper portion and an outlet at its lower portion, is provided for the internal combustion engine 1.

As has been previously explained, during operation of the internal combustion engine 1, the major portion of the heat generated in the combustion chambers thereof is communicated to the cylinder head 2, and only a minor portion of the heat generated in the combustion chambers is communicated directly to the cylinder block 3 of the internal combustion engine 1. Therefore, an imbalance of heating occurs between the cylinder head 2 and the cylinder block 3, and a first preferred embodiment of the cooling system according to the present invention for cooling the internal combustion engine 1, along with a first preferred embodiment of the method for cooling according to the present invention practiced by said first preferred cooling system embodiment, which correct said imbalance, will now be explained.

A cylinder head pump 10 is provided proximate to the cylinder head inlet 6, for impelling cooling fluid through the head cooling jacket 4 from the cylinder head inlet 6 to the cylinder head outlet 8; and, similarly, a cylinder block pump 11 is provided, proximate to the cylinder block inlet 7, for impelling cooling fluid from the cylinder block inlet 7 to the cylinder block outlet 9. To the cylinder head outlet 8 there is connected the upstream end of a head output conduit 12, and to the cylinder block outlet 9 there is connected the upstream end of a block recirculation conduit 13. The end remote from the internal combustion engine 1 of the head output conduit 12 is communicated to the upstream end of a main recirculation conduit 15, which is of relatively low flow resistance compared to the block recirculation conduit 13, and at an intermediate part of which there is provided a radiator flow regulation valve 14. The downstream end of the main recirculation conduit 15 is connected to the inlet of the radiator 16. The outlet of the radiator 16 is connected to the upstream end of a radiator output conduit 17, whose downstream end is connected to the upstream end of a head input conduit 18 and also to the upstream end of a block input conduit 19. The downstream end of the head input conduit 18 is directly connected to the input of the cylinder head pump 10, and the downstream end of the block input conduit 19 is connected to the input of the cylinder block pump 11.

To an intermediate point of the block recirculation conduit 13 there is connected the upstream end of a flow mixing conduit 24, at an intermediate point of which there is provided a block transfer flow regulation valve 25, which regulates the flow rate of cooling fluid through said flow mixing conduit 24; and the downstream end of the flow mixing conduit 24 is connected to an intermediate point of the main recirculation conduit 15, upstream of the radiator flow regulation valve 14. Finally, the downstream end of the block recirculation conduit 13, which is somewhat restricted and has a relatively high resistance to flow of cooling fluid, is connected to an intermediate part of the block input conduit 19, and accordingly the block recirculation conduit 13 communicates the cylinder block outlet 9 directly to the inlet of the cylinder block pump 11, bypassing the radiator 16.

A heater 22 is fed, via an input conduit 21 and an output conduit 23, with part of the cooling fluid flow which is available in the block recirculation conduit 13, via a heater flow control valve 20, in a selective manner.

The radiator flow regulation valve 14 and the block transfer flow regulation valve 25 are controlled by means of valve control signals which are sent to them, which will hereinafter be explained. In the shown preferred embodiment of the cooling system according to the present invention, in fact, these valve control signals are electrical signals, and the radiator flow regulation valve 14 and the block transfer flow regulation valve 25 may be diaphragm actuated cooling fluid valves, their diaphragms being actuated by supply of inlet manifold vacuum thereto which is controlled by electrically controlled vacuum switching valves of per se well known sorts. However, in alternative embodiments, the radiator flow regulation valve 14 and the block transfer flow regulation valve 25 might be directly actuated by supply of electrical energy thereto, via linear motors, solenoids, or the like; this would be quite within the scope of the present invention.

At the cylinder block inlet 7, or in the block input conduit 19, either upstream or downstream of the cylinder block pump 11, but definitely downstream of the point at which the block recirculation conduit 13 joins the block input conduit 19, there is mounted a block input fluid temperature sensor 26, which senses the temperature of the cooling fluid which is passing in through the cylinder block inlet 7 to the block cooling jacket 5, and which generates a sensed temperature signal representative thereof. This sensed temperature signal output from this sensor 26 is sent to a controller 27. The controller 27, based upon the sensed temperature signal received from the block input fluid temperature sensor 26, outputs the aforesaid valve control electrical signals for controlling the radiator flow regulation valve 14 and the block transfer flow regulation valve 25, according to control logic which will be explained hereinafter with respect to the first preferred embodiment of the method according to the present invention.

This controller 27 may be a simple electrical switching system incorporating relays, solenoids, and the like, constructed in a fashion which will be readily conceived of by a person of ordinary skill in the art pertaining thereto, based upon the disclosure of the function of said controller 27 which is contained hereinafter; but, in fact, in the shown first preferred embodiment of the cooling system according to the present invention, this controller 27 is an on board computer, incorporating a microprocessor, and this computer 27 also, in a time shared fashion, performs various other regulatory functions for the internal combustion engine 1. However, the use of such a computer incorporating a microprocessor is not essential.

Now, the operation of the first preferred embodiment of the cooling system according to the present invention described above, according to the first preferred embodiment of the method according to the present invention, will be explained.

Effectively, the controller 27 recognizes two distinct operational conditions for the internal combustion engine 1, according to the temperature of the cooling fluid which is passing into the block cooling jacket 5 through the cylinder block inlet 7, as sensed by the block input fluid temperature sensor 26, and as indicated by the temperature signal received therefrom, and provides, in these two different operational conditions, different forms of control for the radiator flow regulation valve 14, and for the transfer flow regulation valve 25, via the valve and pump control signals therefor which said controller 27 outputs.

First, if the sensed temperature signal from the block input fluid temperature sensor 26 indicates a temperature of the cooling fluid passing in through the cylinder block inlet 7 to the block cooling jacket 5, i.e. the temperature of the cooling fluid which has just been attained by the mixing of the cooling fluid flowing out from the head cooling jacket 4 and the cooling fluid flowing out from the block cooling jacket 5, of less than a certain predetermined temperature value, which for example may be 90° C., then it is considered, according to this first preferred embodiment of the cooling method according to the present invention, that the internal combustion engine 1 is being warmed up from the cold condition. At this time, the controller 27 generates valve control signals for the radiator flow regulation valve 14 and the block transfer flow regulation valve 25 which cause the radiator flow regulation valve 14 to be completely closed, and which cause the block transfer flow regulation valve 25 to be completely opened.

The effect of this mode of operation provided by the controller 27 is that, since the radiator flow regulation valve 14 is kept completely closed by the valve control signal fed thereto, no fluid flow can occur at this time through the main recirculation conduit 15, the radiator 16, and the radiator output conduit 17. In this connection, it should be understood that the provision of the radiator flow regulation valve 14 at an intermediate part of the radiator output conduit 17, instead of in a position as shown in FIG. 1 at an intermediate part of the main recirculation conduit 15, would be consistent with the principles of the present invention, as providing the same function. Therefore, the flow of cooling fluid from the cylinder head outlet 8 enters entirely into the upper end in the figure of the flow mixing conduit 24, passing the block transfer flow regulation valve 25 substantially without obstruction since this block transfer flow regulation valve 25 is open, and meets the flow of cooling fluid which is passing out from the cylinder block outlet 9 through the block recirculation conduit 13. These flows of cooling fluid thus flow together down along the block recirculation conduit 13, mixing therein with one another, and then flow into the intermediate portion of the block input conduit 19 to which the downstream end of the block recirculation conduit 13 is communicated. Therefrom, a part of this cooling fluid is supplied to the inlet side of the cylinder block pump 11, and also a part of this cooling fluid flows through the block input conduit 19 in the right to left direction in the figure to be supplied to the upstream end of the head input conduit 18 via the downstream portion of the radiator output conduit 17 remote from the radiator 16. From the head input conduit 18, this flow then is supplied to the inlet side of the cylinder head pump 10, which pumps it back into the head cooling jacket 4 of the cylinder head 3. In this connection, it should be understood that the block recirculation conduit 13 is somewhat restricted, and, particularly, offers a greater resistance to flow of cooling fluid than does the main recirculation conduit 15, for reasons which will become apparent later.

Of course, at this time, substantially no cooling action at all is provided in this mode of operation by the cooling system according to the present invention to the internal combustion engine 1 as a whole, because the radiator 16 is receiving no flow of cooling fluid; and the operation of the shown first preferred embodiment of the cooling system according to the present invention is only to redistribute heat which is being produced by combustion within the combustion chambers of the internal combustion engine 1 from the cylinder head 2 thereof, which directly receives most of the generated heat, to the cylinder block 3 thereof which directly receives only a minor part of the generated heat. In this connection, it will be understood that no very high speed flow of cooling fluid is necessary at this time through the head cooling jacket 4 of the cylinder head 2, or through the block cooling jacket 5 of the cylinder block 3, since it is intended that the internal combustion engine 1 as a whole should heat up, in this operational condition, and no overall cooling action therefor is now required. Accordingly, although the block recirculation conduit 13 is somewhat restricted, and has a high flow resistance, the flow therethrough will be quite sufficient. As a result of the above explained mode of operation, the warming up characteristic of the cylinder block 3 is much improved, as compared with the case in which the cooling system for the cylinder head 2 is entirely separated from the cooling system for the cylinder block 3. Since it is desirable to raise the temperature of the cylinder block 3 fairly quickly from the cold condition, in order to minimize frictional losses during the warming up process of the internal combustion engine by heating up the lubricating oil contained within it as quickly as possible, and also in order to minimize fuel utilization during engine warmup, and in order to minimize engine wear, especially cylinder bore wear, before the engine block is fairly hot, as explained above, as well as to minimize the emission of improperly combusted hydrocarbons in the exhaust gases of the engine when it is being operated in the cold condition, the above described construction according to the first preferred embodiment of the cooling system according to the present invention is very advantageous.

On the other hand, if the sensed temperature signal produced by the block input fluid temperature sensor 26 indicates that the temperature of the cooling fluid flowing into the block cooling jacket 5 of the cylinder block 3 through the cylinder block inlet 7, i.e. the temperature of the cooling fluid which has just been attained by the mixing of the cooling fluid flowing out from the head cooling jacket 4 and the cooling fluid flowing out from the block cooling jacket 5, is greater than the above mentioned predetermined temperature value, i.e. in this case 90° C., then in this second operational condition the controller 27 generates a different set of control signals for the radiator flow regulation valve 14, and for the block transfer flow regulation valve 25, as follows.

The valve control signal output to the radiator flow regulation valve 14 at this time is such as to keep the radiator flow regulation valve 14 completely open. Thus, cooling fluid is now allowed to pass through the radiator flow regulation valve 14 without encountering any substantial flow resistance, into the main recirculation conduit 15, and to the inlet of the radiator 16. Thus, cooling fluid which has passed through the head cooling jacket 4 and has been heated therein flows out through the cylinder head outlet 8, through the head output conduit 12, into the upstream end of the main recirculation conduit 15, past the radiator flow regulation valve 14, and along through the main recirculation conduit 15 to its downstream end, whence it enters into the inlet of the radiator 16. This flow of cooling fluid is then cooled within the radiator 16 in a per se well known fashion, and passes out of the outlet of the radiator 16 into the upstream end of the radiator output conduit 17, along which it flows, and from the downstream end of which it passes into the upstream end of the head input conduit 18. Then, this cooling fluid passes through the head input conduit 18 to be supplied to the inlet of the cylinder head pump 10, which pumps it into the cylinder head inlet 6, whence it is returned to the head cooling jacket 4.

Further, at this time, the controller 27 outputs a valve control signal to the block transfer flow regulation valve 25 which controls it in the following manner. When the sensed temperature signal received by the controller 27 from the block input fluid temperature sensor 26 indicates a temperature of the cooling fluid flowing in through the cylinder block inlet 7 to the block cooling jacket 5 of less than a second predetermined temperature value, which is higher than the above mentioned first predetermined temperature value which in this first preferred embodiment is 90° C., and for instance may be 95° C., then the controller 27 outputs a control signal to the block transfer flow regulation valve 25 which causes said valve 25 to be substantially completely closed, and accordingly in this condition no cooling fluid can flow through the flow mixing conduit 24, either from the intermediate part of the block recirculation conduit 13 connected thereto, along said flow mixing conduit 24, into the upstream end of the main recirculation conduit 15 and down past the radiator flow regulation valve 14, which is situated in an intermediate position within the main recirculation conduit 15, to flow into the inlet of the radiator 16 and from the outlet thereof, after being cooled, into the head cooling jacket 4, or vice versa from the downstream end of the head output conduit 12 connected thereto, along said flow mixing conduit 24, into the intermediate part of the block recirculation conduit 13 connected thereto. Accordingly, by the pumping action of the cylinder block pump 11, all of the flow of cooling fluid through the block cooling jacket 5 is forced into the upstream end of the restricted block recirculation conduit 13, and passes down through the block recirculation conduit 13 to be supplied from its downstream end back to the inlet of the cylinder block pump 11, without being substantially cooled. Thus, in this condition, since all of the cooling fluid which is passing through the block cooling jacket 5 is being recirculated to the inlet of the cylinder block pump 11 to be returned into the block cooling jacket 5 without being substantially cooled, thereby the temperature of the cooling fluid within the block cooling jacket 5 and at the cylinder block outlet 9 thereof increases, while on the other hand, since all of the cooling fluid which is passing through the head cooling jacket 4 is being passed through the radiator 16 before being recirculated to the inlet of the cylinder head pump 10 to be returned into the head cooling jacket 4, thereby the temperature of the cooling fluid within the head cooling jacket 4 decreases.

On the other hand, when the sensed temperature signal received by the controller 27 from the block input fluid temperature sensor 26 indicates a temperature of the cooling fluid flowing in through the cylinder block inlet 7 to the block cooling jacket 5 of the cylinder block 3 which is greater than said second predetermined temperature value, i.e. in this case greater than 95° C., then the controller 27, based upon this sensed temperature signal, generates a valve control signal which controls the block transfer flow regulation valve 25 to be partially or entirely opened, so that a substantial amount of cooling fluid, after having passed through the block cooling jacket 5 and having been heated therein, passes from an intermediate portion of the block recirculation conduit 13 into the lower end in FIG. 1 of the flow mixing conduit 24, and passes the block transfer flow regulation valve 25, to enter into the upstream end of the main recirculation conduit 15, to pass the open radiator flow regulation valve 14 and to flow towards the radiator 16. After having been cooled in the radiator 16, this cooled cooling fluid flow enters the upstream end of the radiator output conduit 17 and passes out from the downstream end thereof into the block input conduit 19 to be sucked in by the inlet of the cylinder block pump 11, and to be driven thereby back into the block cooling jacket 5. At this time, because the block recirculation conduit 13 is restricted, and has a fairly high resistance to flow of cooling fluid, quite a large amount of the flow of cooling fluid which is being expelled through the cylinder block outlet 9 into the block recirculation conduit 13 passes through the flow mixing conduit 24 to be cooled in the radiator 16, in fact as much as can pass the block transfer flow regulation valve 25, according to the degree of opening of the block transfer flow regulation valve 25 provided by the controller 27, and only a part of this cooling fluid passes along the block recirculation conduit 13 to be recirculated directly to the inlet of the cylinder block pump 11 without being cooled. Accordingly, quite a large proportion of the flow of cooling fluid through the block cooling jacket 5 is cooled by being passed through the radiator 16, and accordingly the temperature of the cooling fluid within the block cooling jacket 5 drops.

By the combination of these two actions of the controller 27 to open and to close the block transfer flow regulation valve 25, according to whether the sensed temperature signal received by the controller 27 from the block input fluid temperature sensor 26 indicates a temperature of the cooling fluid flowing in through the cylinder block inlet 7 to block cooling jacket 5 of less than said second predetermined temperature value, exemplarily 95° C., or alternatively the sensed temperature signal received by the controller 27 from the block input fluid temperature sensor 26 indicates a temperature of the cooling fluid flowing in through the cylinder block inlet 7 to the block cooling jacket 5 of greater than said second predetermined temperature value, therefore, in a feedback manner, the temperature of the cooling fluid passing in through the cylinder block inlet 7 to the block cooling jacket 5 is maintained substantially to be at the second above described predetermined temperature value, which in the shown first embodiment is 95° C. This means that the temperature of the cylinder block 3 as a whole is maintained substantially at the second predetermined temperature value, i.e. in the shown first preferred embodiment, at 95° C., which is of course substantially higher than the temperature at which the cylinder head 2 is being maintained at this time, since the cooling fluid which is circulating through the head cooling jacket 4 is entirely, as described above, cooling fluid which has passed through the radiator 16 to be cooled. Accordingly, by thus keeping the cylinder head 2 substantially cooler than the cylinder block 3 during warmed up operation of the internal combustion engine 1, the cylinder block 3 may be kept significantly hotter than is possible with a conventional cooling system in which the head cooling fluid and the block cooling fluid are both always being passed through the same radiator and are being cooled together. Further, the temperature of the lubricating oil contained within the internal combustion engine 1 is at this time kept at at least the temperature of the cylinder block 3, and in fact is maintained at a significantly higher temperature, due to the dissipation of mechanical energy therein. Of course, by keeping the cylinder head 2 as cool as possible, and by using as much of the capacity of the radiator 16 as possible for cooling the cylinder head 2, the possibility of the occurrence of knocking or pinking in the internal combustion engine 1 is greatly reduced. The keeping of the cylinder block 3 as hot as possible within a predetermined limit, i.e. substantially at the second predetermined temperature value, of exemplarily 95° C., ensures that frictional losses in the internal combustion engine 1 are kept as low as possible, and also is beneficial with regard to the minimization of the amount of improperly combusted hydrocarbons which are emitted in the exhaust gases of the internal combustion engine. Further, in contrast to a conventional type of cooling system as discussed above which uses completely separate cooling systems for the cylinder head and for the cylinder block, the full capacity of the radiator 16 can be effectively utilized, according to the first embodiment of the present invention described above, because of the flexibility available for determining the proportions of the cooling capacity of the radiator which can be allocated to the cylinder head 2 and to the cylinder block 3 for cooling them.

Figure 2:
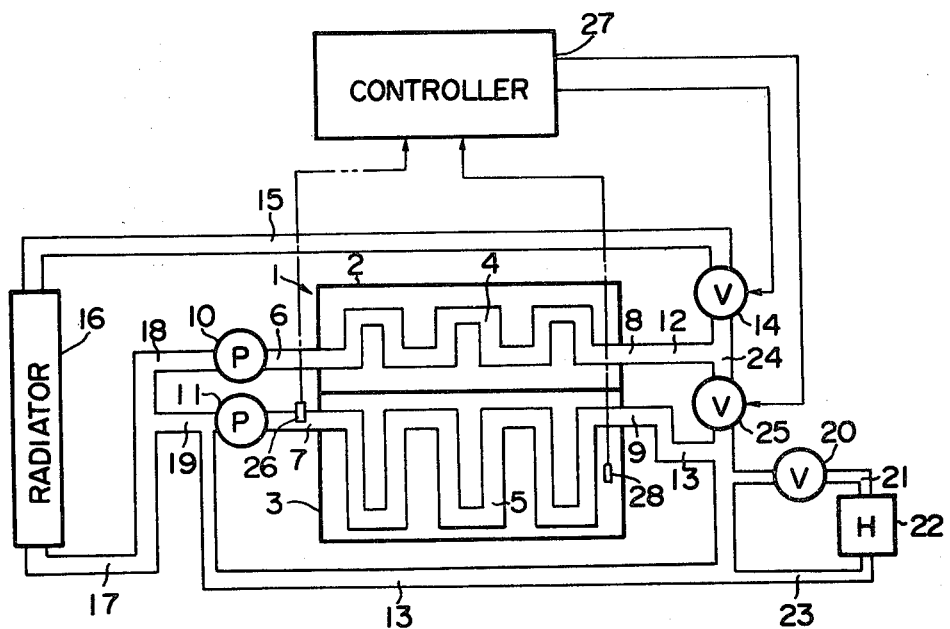
FIG. 2 is a diagrammatical illustration, showing a second preferred embodiment of the cooling system according to the present invention, for practicing a second preferred embodiment of the method according to the present invention, in which a temperature sensor is also provided for sensing the temperature of the lubricating oil which is contained within the cylinder block.

In FIG. 2, there is shown in a schematic view by a diagrammatical drawing a second preferred embodiment of the cooling system according to the present invention, which practices another preferred embodiment of the method for cooling according to the present invention. In FIG. 2, parts which correspond to parts of the first preferred embodiment of the cooling system according to the present invention shown in FIG. 1, and which have the same functions, are designated by the same reference numerals as in that figure.

This second preferred embodiment of the cooling system according to the present invention differs from the first preferred embodiment of the cooling system according to the present invention shown in FIG. 1, only in that a lubricating oil temperature sensor 28 which is provided to the cylinder block 3 detects the temperature of the lubricating oil contained within the cylinder block 3, and produces a lubricating oil temperature signal representative thereof, said lubricating oil temperature signal being sent to the controller 27.

The method of functioning of this second preferred embodiment of the cooling system according to the present invention is similar to that of the first preferred embodiment of the cooling system according to the present invention shown in FIG. 1, except in the following way. In the first operational condition, when the sensed temperature signal from the block input fluid temperature sensor 26 indicates a cooling fluid temperature of the cooling fluid flowing in through the cylinder block inlet 7 to the block cooling jacket 5 which is less than said first predetermined temperature of for example 90° C., then the operation according to the present invention of this second preferred embodiment of the cooling system according to the present invention is the same as that of the first preferred embodiment of the cooling system according to the present invention shown in FIG. 1 and described above: the radiator flow regulation valve 14 is kept completely closed, by being fed with an appropriate valve control signal from the controller 27; and the block transfer flow regulation valve 25 in the flow mixing conduit 24 is kept completely open, by being fed with an appropriate valve control signal, also, by the controller 27. On the other hand, when the temperature as sensed by the block input fluid temperature sensor 26 of the cooling fluid flowing into the block cooling jacket 5 attains the aforesaid first predetermined temperature, in this example 90° C., then the cooling system according to this second preferred embodiment of the cooling system according to the present invention goes into its second mode of operation.

In this second mode of operation, the radiator flow regulation valve 14 is fully opened, by appropriate valve control signals sent thereto by the controller 27, so as to cool the cylinder head 2 as much as possible in order to prevent knocking, and the block transfer flow regulation valve 25 is controlled in the same feedback manner as explained with regard to the operation of the first preferred embodiment shown in FIG. 1, in order to keep the temperature of the cooling fluid flowing into the block cooling jacket 5 of the cylinder block 3 at substantially the second predetermined temperature, for example 95° C., except that, if the lubricating oil temperature signal provided to the controller 27 by the lubricating oil temperature sensor 28 indicates a temperature of the lubricating oil within the cylinder block 3 of greater than a certain predetermined danger temperature, for example 120° C., then the controller 27 outputs a valve control signal to the block transfer flow regulation valve 25 which opens said block transfe flow regulation valve to the maximum amount, so as quickly to cool the lubricating oil within the cylinder block 3, in an emergency fashion. In other words, the effective preset second predetermined temperature of the cooling fluid flowing into the block cooling jacket 5 of the cylinder block 3, which is being maintained by the aforesaid feedback regulation, is lowered.

Further, with regard to the matter of the heater 22 fitted in the automobile passenger compartment, when this is fitted, as is shown in FIGS. 1 and 2 and is customary, so as to use heated cooling fluid diverted, via conduits 21 and 23, from an intermediate part of the block recirculation conduit 13, so as to use cooling fluid from the cylinder block 3 for heating the heater core, rather than cooling fluid from the cylinder head 2, or a mixture of cooling fluid from the cylinder block 3 and the cylinder head 2, then a better heating effect is made available, because the cooling fluid of the cylinder block 3 is, as explained above, generally hotter than is the cooling fluid of the cylinder head 2.

Thus, it is seen that, in this second preferred embodiment of the cooling system according to the present invention also, the various advantages and benefits of the present invention are available. The occurence of knocking in the cylinders of the internal combustion engine 1 is guarded against by keeping the cylinder head 2 cool, and at the same time the cylinder block 3 is kept warmer than in the type of prior art wherein the block cooling fluid flow and the head cooling fluid are mixed at all times. Further, the warming up time for the internal combustion engine 1 is kept minimal, and hence wear thereof during warming up, and consumption of fuel during this warm up period, are minimized. Yet further, in this second preferred embodiment, overheating of the lubricating oil within the cylinder block 3 is guarded against by an emergency monitoring system.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:
1. For an internal combustion engine comprising:
   (a) a cylinder head formed with a head cooling jacket for cooling said cylinder head, said head cooling jacket being formed with a cylinder head inlet and a cylinder head outlet;
   (b) a cylinder block formed with a block cooling jacket for cooling said cylinder block, said block cooling jacket being formed with a cylinder block inlet and a cylinder block outlet; and
   (c) a radiator formed with an inlet and an outlet;
   a cooling system, comprising:
   (d) a first pump for impelling cooling fluid through said head cooling jacket from said cylinder head inlet towards said cylinder head outlet;
   (e) a second pump for impelling cooling fluid through said block cooling jacket from said cylinder block inlet towards said cylinder block outlet;
   (f) a block input fluid temperature sensor for sensing the temperature of the cooling fluid which passes out through said cylinder block inlet to said block cooling jacket, and for generating a sensed block input temperature signal representative of said temperature;
   (g) a block recirculation conduit system leading from said cylinder block outlet of said block cooling jacket so as to supply flow of cooling fluid, from a downstream part of said block recirculation conduit system, to said cylinder block inlet of said block cooling jacket;
   (h) a main recirculation conduit system, an upstream part of which is communicated to said cylinder head outlet of said head cooling jacket, and a downstream part of which is communicated to said inlet of said radiator;
   (i) a radiator output conduit system, leading from said outlet of said radiator both to said cylinder head inlet of said head cooling jacket and also to said cylinder block inlet of said block cooling jacket, said downstream part of said block recirculation conduit system being thereby communicated also to said cylinder head inlet of said head cooling jacket;
   (j) a first control valve for controlling flow of cooling fluid through said radiator according to a radiator flow regulation signal;
   (k) a flow mixing conduit which communicates a part of said main recirculation conduit system with a part of said block recirculation conduit system;
   (l) a second control valve for controlling flow of cooling fluid through said flow mixing conduit according to a block flow regulation signal;

and (m) a controller, which receives said sensed block input temperature signal from said block input fluid temperature sensor, and which produces, based thereon, said radiator flow regulation signal which is sent to said first control valve, and also said block flow regulation signal which is sent to said second control valve;

(n) whereby said controller can vary the amount of cooling operation provided for said internal combustion engine, by varying the opening amount of said first control valve, thus varying the amount of cooling fluid passing through said radiator; and can also vary the amount of mixing between the cooling circuit for said cylinder head and the cooling circuit for said cylinder block, by varying the opening amount of said second control valve, thus varying the amount of cooling fluid passing through said flow mixing conduit.

2. A cooling system according to claim 1, wherein the flow resistance of said block recirculation conduit system, from said part thereof to which said flow mixing conduit is communicated, to said downstream part thereof, is substantially higher than the flow resistance of the series combination of (a) said main recirculation conduit system from said part thereof to which said flow mixing conduit is communicated to said inlet of said radiator; (b) said radiator; and (c) said radiator output conduit system from said outlet of said radiator to the part of said radiator output conduit system communicated to said cylinder block inlet of said block cooling jacket; whereby, the more said controller opens said second control valve, by supply of said block flow regulation signal thereto, the more of the flow of cooling fluid through said block cooling jacket will pass through said main recirculation conduit system to be cooled in said radiator, without any risk that said block jacket cooling fluid flow should pass preferentially through said block recirculation conduit system.

3. A cooling system according to claim 1, wherein said first control valve is mounted upstream of said inlet of said radiator in an intermediate part of said main recirculation conduit system which is downstream of the part of said main recirculation system to which said flow mixing conduit communicates.

4. A cooling system according to claim 1, wherein said first control valve is mounted in an intermediate part of said radiator output conduit system.

5. A cooling system according to claim 1, further comprising a heater which is supplied with cooling fluid which is diverted from an intermediate part of said block recirculation conduit system; whereby said heater may be provided with cooling fluid which is as warm as practicable.

6. A cooling system according to claim 1, wherein said controller, depending on said sensed block input temperature signal from said block output fluid temperature sensor, either (n) if said sensed block input temperature signal from said block input fluid temperature sensor indicates a cooling fluid temperature at said cylinder block inlet of said block cooling jacket of less than a certain first predetermined temperature value, then simultaneously:

(n1) controls said first control valve, by said radiator flow regulation signal, so as substantially to interrupt the flow of cooling fluid through said radiator; and (n2) controls said second control valve, by said block flow regulation signal, so as to allow a substantial flow of cooling fluid through said flow mixing conduit;

or (o) if said sensed block input temperature signal from said block input fluid temperature sensor indicates a cooling fluid temperature at said cylinder block inlet of said block cooling jacket of greater than said first predetermined temperature value, then simultaneously:

(o1) controls said first control valve, by said radiator flow regulation signal, so as to allow cooling fluid to flow through said radiator; and (o2) controls said second control valve, by said block flow regulation signal, so as to allow a controlled flow of cooling fluid through said flow mixing conduit;

(p) whereby, during the warming up process of said internal combustion engine, before the cooling fluid which passes in through said cylinder block inlet to said block cooling jacket has attained said first predetermined temperature, the cooling systems for said cylinder head and for said cylinder block are substantially communicated, and no substantial cooling is provided for either by said radiator, so that the heat which is supplied to the cooling fluid within the head cooling jacket is communicated to the cooling fluid within the block cooling jacket, and both the cylinder head and the cylinder block are quickly warmed up together; but, after said cooling fluid which passes in through said cylinder block inlet to said block cooling jacket has attained said first predetermined temperature, then according to said control performed by said controller according to action (o1) substantial cooling is provided for the cooling fluid in said head cooling jacket, while according to said control performed according to action (o2) the amount of cooling provided for the cooling fluid in said block cooling jacket is regulated; whereby, after said internal combustion engine has been warmed up, said cylinder block may be kept substantially warmer than said cylinder head.

7. A cooling system according to claim 6, wherein said controller, in case (o1), always controls said first control valve so as to keep said first control valve fully open; whereby, after the cooling fluid which passes in through said cylinder block inlet to said block cooling jacket has attained said first predetermined temperature, then said cylinder head is always cooled to the maximum possible amount, by the cooling action of said radiator.

8. A cooling system according to either claim 6 or claim 7, wherein in case (o) said controller so controls the opening amount of said second valve, by said block flow regulation signal, as to allow such an amount of cooling fluid to flow through said flow mixing conduit as to keep the sensed block input temperature signal produced by said block input fluid temperature sensor approximately at a level indicative of a second predetermined temperature; whereby the temperature of said cylinder block is controlled to be substantially constant.

9. A cooling system according to claim 8, wherein said second predetermined temperature is substantially higher than said first predetermined temperature; whereby the temperature of said cylinder block is controlled to be substantially higher than the temperature of said cylinder head.

10. A cooling system according to claim 9, wherein in case (o), if said temperature indicated by said sensed block input temperature signal is substantially higher than said second predetermined temperature, then said controller controls said second valve, by said block flow regulation signal, so as to open up said second valve wider so as to decrease its flow resistance; and, if said indicated temperature is substantially lower than said second predetermined temperature, said controller controls said second valve so as to make said second valve more closed so as to increase its flow resistance; whereby, by a feedback control, the cooling fluid temperature at said cylinder block inlet of said block cooling jacket is controlled to be substantially equal to said second predetermined temperature.

11. A cooling system according to any one of claims 1-5, further comprising an engine lubricating oil temperature sensor for detecting the temperature of lubricating oil contained within said cylinder block, and for producing a lubricating oil temperature signal representative thereof, said lubricating oil temperature signal being supplied to said controller.

12. A cooling system according to either one of claims 6 and 7, further comprising an engine lubricating oil temperature sensor for detecting the temperature of lubricating oil contained within said cylinder block, and for producing a lubricating oil temperature signal representative thereof, said lubricating oil temperature signal being supplied to said controller.

13. A cooling system according to claim 12, wherein in case (o) said controller so controls the opening amount of said second valve, by said block flow regulation signal, as to allow such an amount of cooling fluid to flow through said flow mixing conduit as to keep the sensed block input temperature signal produced by said block input fluid temperature sensor approximately at a level indicative of a second predetermined temperature, except that if the engine lubricating oil temperature signal produced by said engine lubricating oil temperature sensor is indicative of a lubricating oil temperature of the lubricating oil contained within said cylinder block of higher than a third predetermined temperature, then said controller supplies such a block flow regulation signal to said second control valve as to cause said second control valve to open to the maximum amount; whereby the temperature of said cylinder block is controlled to be substantially constant, except that if the temperature of said lubricating oil contained within said cylinder block rises to higher than said third predetermined temperature, which is the danger temperature, then emergency cooling action is provided for said cylinder block, in order to immediately cool down said lubricating oil contained therein.

14. A cooling system according to claim 13, wherein said second predetermined temperature is substantially higher than said first predetermined temperature.

15. A cooling system according to claim 14, wherein said third predetermined temperature is substantially higher than said second predetermined temperature.

16. A cooling system according to claim 15, wherein in case (o), if said temperature indicated by said sensed block input temperature signal is substantially higher than said second predetermined temperature, and is less than said third predetermined temperature, then said controller controls said second valve, by said block flow regulation signal, so as to open up said second valve wider so as to decrease its flow resistance; and, if said indicated temperature is substantially lower than said second predetermined temperature, said controller controls said second valve so as to make said second valve more closed so as to increase its flow resistance; whereby, by a feedback control, the cooling fluid temperature at said cylinder block inlet of said block cooling jacket is controlled to be substantially equal to said second predetermined temperature, except in said emergency case when the temperature of said lubricating oil contained within said cylinder block rises to higher than said third predetermined temperature which is the danger temperature.

17. A method for operating a cooling system of an internal combustion engine having:
  (a) a cylinder head formed with a head cooling jacket for cooling said cylinder head, said head cooling jacket being formed with a cylinder head inlet and a cylinder head outlet;
  (b) a cylinder block formed with a block cooling jacket for cooling said cylinder block, said block cooling jacket being formed with a cylinder block inlet and a cylinder block outlet; and
  (c) a radiator formed with an inlet and an outlet;
said cooling system, comprising:
  (d) a first pump for impelling cooling fluid through said head cooling jacket from said cylinder head inlet towards said cylinder head outlet;
  (e) a second pump for impelling cooling fluid through said block cooling jacket from said cylinder block inlet towards said cylinder block outlet;
  (f) a block input fluid temperature sensor for sensing the temperature of the cooling fluid which passes out through said cylinder block inlet to said block cooling jacket, and for generating a sensed block input temperature signal representative of said temperature;
  (g) a block recirculation conduit system leading from said cylinder block outlet of said block cooling jacket so as to supply flow of cooling fluid, from a downstream part of said block recirculation conduit system, to said cylinder block inlet of said block cooling jacket;
  (h) a main recirculation conduit system, an upstream part of which is communicated to said cylinder head outlet of said head cooling jacket, and a downstream part of which is communicated to said inlet of said radiator;
  (i) a radiator output conduit system, leading from said outlet of said radiator both to said cylinder head inlet of said head cooling jacket and also to said cylinder block inlet of said block cooling jacket, said downstream part of said block recirculation conduit system being thereby communicated also to said cylinder head inlet of said head cooling jacket;
  (j) a first control valve for controlling flow of cooling fluid through said radiator according to a radiator flow regulation signal;
  (k) a flow mixing conduit which communicates a part of said main recirculation conduit system with a part of said block recirculation conduit system;
  (l) a second control valve for controlling flow of cooling fluid through said flow mixing conduit according to a block flow regulation signal; and
  (m) a controller, which receives said sensed block input temperature signal from said block input fluid temperature sensor, and which produces, based thereon, said radiator flow regulation signal which is sent to said first control valve, and also said block flow regulation signal which is sent to said second control valve;

(n) whereby said controller can vary the amount of cooling operation provided for said internal combustion engine, by varying the opening amount of said first control valve, thus varying the amount of cooling fluid passing through said radiator; and can also vary the amount of mixing between the cooling circuit for said cylinder head and the cooling circuit for said cylinder block, by varying the opening amount of said second control valve, thus varying the amount of cooling fluid passing through said flow mixing conduit;

said cooling system being filled with cooling fluid;

said method comprising the processes, simultaneously performed, of:

(o) operating said first pump and said second pump; and (p) depending upon said sensed block output temperature signal from said block output fluid temperature sensor, performing either one or the other but not both of the following two processes (q) and (r):

(q) if said sensed block output temperature signal from said block output fluid temperature sensor indicates a cooling fluid temperature at said cylinder block outlet of said block cooling jacket of less than a certain first predetermined temperature value, then simultaneously:

(q1) controlling said first control valve, by said radiator flow regulation signal from said controller, so as substantially to interrupt flow of cooling fluid through said radiator; and (q2) controlling said second control valve, by said block flow regulation signal, so as to allow a flow of cooling fluid through said flow mixing conduit;

(r) if said sensed block output temperature signal from said block output fluid temperature sensor indicates a cooling fluid temperature at said cylinder block outlet of said block cooling jacket of greater than said first predetermined temperature value, then simultaneously:

(r1) controlling said first control valve, by said radiator flow regulation signal from said controller, so as to allow cooling fluid to flow through said radiator; and (r2) controlling said second control valve, by said block flow regulation signal, so as to allow a controlled flow of cooling fluid through said flow mixing conduit;

(s) whereby, during the warming up process of said internal combustion engine, before the cooling fluid which passes out through said cylinder block outlet of said block cooling jacket has attained said first predetermined temperature, the cooling systems for said cylinder head and for said cylinder block are substantially communicated, and no substantial cooling is provided for either by said radiator, so that the heat which is supplied to the cooling fluid within the head cooling jacket is communicated to the cooling fluid within the block cooling jacket, and both the cylinder head and the cylinder block are quickly warmed up together; but, after said cooling fluid which passes out through said cylinder block outlet of said block cooling jacket has attained said first predetermined temperature, then according to process (r1) substantial cooling is provided for the cooling fluid in said head cooling jacket, while according to process (r2) the amount of cooling provided for the cooling fluid in said block cooling jacket is regulated; whereby, after said internal combustion engine has been warmed up, said cylinder block may be kept substantially warmer than said cylinder head.

18. A method according to claim 17, wherein during process (r1) said first control valve is so controlled as to keep said first control valve fully open; whereby, after the cooling fluid which passes out through said cylinder block outlet of said block cooling jacket has attained said first predetermined temperature, then said cylinder head is always cooled to the maximum possible amount, by the cooling action of said radiator.

19. A method according to either claim 17 or claim 18, wherein in process (r2) the opening amount of said second valve is so controlled, by said block flow regulation signal, as to allow such an amount of cooling fluid to flow through said flow mixing conduit as to keep the sensed block input temperature signal produced by said block input fluid temperature sensor approximately at a level indicative of a second predetermined temperature; whereby the temperature of said cylinder block is controlled to be substantially constant.

20. A method according to claim 19, wherein said second predetermined temperature is substantially higher than said first predetermined temperature; whereby the temperature of said cylinder block is controlled to be substantially higher than the temperature of said cylinder head.

21. A method according to claim 20, wherein in process (r), if said temperature indicated by said sensed block input temperature signal is substantially higher than said second predetermined temperature, then said second valve is controlled, by said block flow regulation signal, so as to open up said second valve wider so as to decrease its flow resistance; and, if said indicated temperature is substantially lower than said second predetermined temperature, said second valve is controlled so as to make said second valve more closed so as to increase its flow resistance; whereby, by a feedback control, the cooling fluid temperature at said cylinder block inlet of said block cooling jacket is controlled to be substantially equal to said second predetermined temperature.

22. A method according to either one of claims 17 and 18, said cooling system further comprising an engine lubricating oil temperature sensor for detecting the temperature of lubricating oil contained within said cylinder block, and for producing a lubricating oil temperature signal representative thereof, said lubricating oil temperature signal being supplied to said controller.

23. A method according to claim 22, wherein in process (r) the opening amount of said second valve is so controlled, by said block flow regulation signal, as to allow such an amount of cooling fluid to flow through said flow mixing conduit as to keep the sensed block input temperature signal produced by said block input fluid temperature sensor approximately at a level indicative of a second predetermined temperature, except that if the engine lubricating oil temperature signal produced by said engine lubricating oil temperature sensor is indicative of a lubricating oil temperature of the lubricating oil contained within said cylinder block of higher than a third predetermined temperature, then such a block flow regulation signal is supplied to said second valve as to cause said second control valve to open to the maximum amount; whereby the temperature of said cylinder block is controlled to be substantially constant, except that if the temperature of said lubricating oil contained within said cylinder block rises to higher than said third predetermined temperature, which is the danger temperature, then emergency cooling action is provided for said cylinder block, in order to immediately cool down said lubricating oil contained therein.

24. A method according to claim 23, wherein said second predetermined temperature is substantially higher than said first predetermined temperature.

25. A method according to claim 24, wherein said third predetermined temperature is substantially higher than said second predetermined temperature.

26. A method according to claim 25, wherein in process (r), if said temperature indicated by said sensed block input temperature signal is substantially higher than said second predetermined temperature, and is less than said third predetermined temperature, then said second valve is so controlled, by said block flow regulation signal, as to open up said second valve wider so as to decrease it flow resistance; and, if said indicated temperature is substantially lower than said second predetermined temperature, said second valve is so controlled as to make said second valve more closed so as to increase its flow resistance; whereby, a feedback control, the cooling fluid temperature at said cylinder block inlet input of said block cooling jacket is controlled to be substantially equal to said second predetermined temperature, except in said emergency case when the temperature of said lubricating oil contained within said cylinder block rises to higher than said third predetermined temperature which is the danger temperature.

* * * * *